United States Patent [19]
Mallick et al.

[11] Patent Number: 5,764,940
[45] Date of Patent: Jun. 9, 1998

[54] PROCESSOR AND METHOD FOR EXECUTING A BRANCH INSTRUCTION AND AN ASSOCIATED TARGET INSTRUCTION UTILIZING A SINGLE INSTRUCTION FETCH

[75] Inventors: Soummya Mallick; Rajesh Bhikhubhai Patel; Romesh Mangho Jessani, all of Austin, Tex.

[73] Assignees: International Business Machines Corporation, Armonk, N.Y.; Motorola, Inc., Schaumburg, Ill.

[21] Appl. No.: 757,186

[22] Filed: Nov. 27, 1996

[51] Int. Cl.⁶ ................................................. G06F 9/38
[52] U.S. Cl. .................... 395/382; 395/584; 711/137
[58] Field of Search ............................. 395/381, 382, 395/388, 391, 582, 584, 586, 800.23, 581; 711/119, 125, 137, 213

[56] References Cited

U.S. PATENT DOCUMENTS

| | | | |
|---|---|---|---|
| 4,943,908 | 7/1990 | Emma et al. | 395/587 |
| 5,442,760 | 8/1995 | Rustad et al. | 395/391 |
| 5,511,172 | 4/1996 | Kimura et al. | 395/582 |
| 5,515,518 | 5/1996 | Stiles et al. | 395/586 |
| 5,586,295 | 12/1996 | Tran | 711/137 |
| 5,680,564 | 10/1997 | Divivier et al. | 395/381 |

*Primary Examiner*—Parshotam S. Lall
*Assistant Examiner*—Viet Vu
*Attorney, Agent, or Firm*—Brian F. Russell; Andrew J. Dillon

[57] ABSTRACT

A processor and method of executing instructions within a processor are disclosed, which permit both a branch instruction and a target instruction of the branch instruction to be executed in response to a single instruction fetch. In accordance with an illustrative embodiment, the processor, which has an associated memory, simultaneously fetches a plurality of instructions from the memory. Branch instructions among the plurality of instructions are then detected. In response to a detection of a branch instruction among the plurality of instructions, a determination is made whether a target instruction to be executed in response to execution of the branch instruction is one of the plurality of instructions. In response to a determination that the target instruction is one of the plurality of instructions, the processor executes the target instruction without making an additional instruction fetch.

18 Claims, 5 Drawing Sheets

PROCESSOR AND METHOD FOR EXECUTING A BRANCH INSTRUCTION AND AN ASSOCIATED TARGET INSTRUCTION UTILIZING A SINGLE INSTRUCTION FETCH

BACKGROUND

1. Technical Field

The technical field of the present specification relates in general to a method and system for data processing and in particular to a processor and method for executing instructions such that instruction fetch latency is reduced. Still more particularly, the technical field relates to a processor and method for executing instructions, which reduce instruction fetch latency in cases in which a branch instruction and its associated target instruction are retrieved in a single instruction fetch.

2. Description of the Related Art

A superscalar processor can comprise, for example, an instruction cache for storing instructions, an instruction fetcher for fetching instructions from the instruction cache, one or more execution units for executing sequential instructions, a branch processing unit (BPU) for executing branch instructions, a dispatch unit for dispatching sequential instructions to particular execution units, and a completion buffer for temporarily storing sequential instructions that have finished execution, but have not completed.

Branch instructions executed by the branch processing unit (BPU) of the superscalar processor can be classified as either unconditional or conditional branch instructions. Unconditional branch instructions are branch instructions that change the flow of program execution from a sequential execution path to a specified target execution path and which do not depend upon a condition supplied by the occurrence of an event. Thus, the branch specified by an unconditional branch instruction is always taken. In contrast, conditional branch instructions are branch instructions for which the indicated branch in program flow may be taken or not taken depending upon a condition within the processor, for example, the state of specified condition register bits or the value of a counter.

Conditional branch instructions can be further classified as either resolved or unresolved, based upon whether or not the condition upon which the branch depends is available when the conditional branch instruction is evaluated by the branch processing unit (BPU). Because the condition upon which a resolved conditional branch instruction depends is known prior to execution, resolved conditional branch instructions can typically be executed and instructions within the target execution path fetched with only a small delay in the execution of sequential instructions. Unresolved conditional branches, on the other hand, can create significant performance penalties if fetching of sequential instructions is delayed until the condition upon which the branch depends becomes available and the branch is resolved. Therefore, in order to minimize execution stalls, some processors speculatively execute unresolved branch instructions by predicting whether or not the indicated branch will be taken. Utilizing the result of the prediction, the fetcher is then able to fetch instructions within the speculative execution path prior to the resolution of the branch, thereby avoiding a stall in the execution pipeline in cases in which the branch is subsequently resolved as correctly predicted.

Within conventional superscalar processors, the execution of both unconditional and conditional branch instructions entails calculating the address of a target instruction to be executed following execution of the branch instruction and forwarding the address of the target instruction to the instruction cache to initiate the fetching of instructions following the target address. The target and subsequent instructions are then returned from the instruction cache after one or more cycles, depending upon whether or not the requested instructions are resident within the instruction cache. Although the latency associated with each instruction fetch is typically only a few cycles when cache hit rates are high, the overall instruction fetch latency incurred during the execution of a program can be quite large due to the numerous tight instruction loops (and therefore branches) that a typical program includes.

Therefore, in order to enhance processor performance, a method of executing instructions is needed that reduces or eliminates the instruction fetch latency associated with executing branch instructions.

SUMMARY

It is therefore one object of the present disclosure to provide a method and system for data processing.

It is another object of the present disclosure to provide a processor and method for executing instructions such that instruction fetch latency is reduced.

It is yet another object of the present disclosure to provide a processor and method for executing instructions, which reduce instruction fetch latency in cases in which a branch instruction and its associated target instruction are retrieved in a single instruction fetch.

The foregoing objects are achieved as is now described. A processor and method of executing instructions within a processor are disclosed, which permit both a branch instruction and a target instruction of the branch instruction to be executed in response to a single instruction fetch. In accordance with an illustrative embodiment, the processor, which has an associated memory, simultaneously fetches a plurality of instructions from the memory. Branch instructions among the plurality of instructions are then detected. In response to a detection of a branch instruction among the plurality of instructions, a determination is made whether a target instruction to be executed in response to execution of the branch instruction is one of the plurality of instructions. In response to a determination that the target instruction is one of the plurality of instructions, the processor executes the target instruction without making an additional instruction fetch.

The above as well as additional objects, features, and advantages of an illustrative embodiment will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
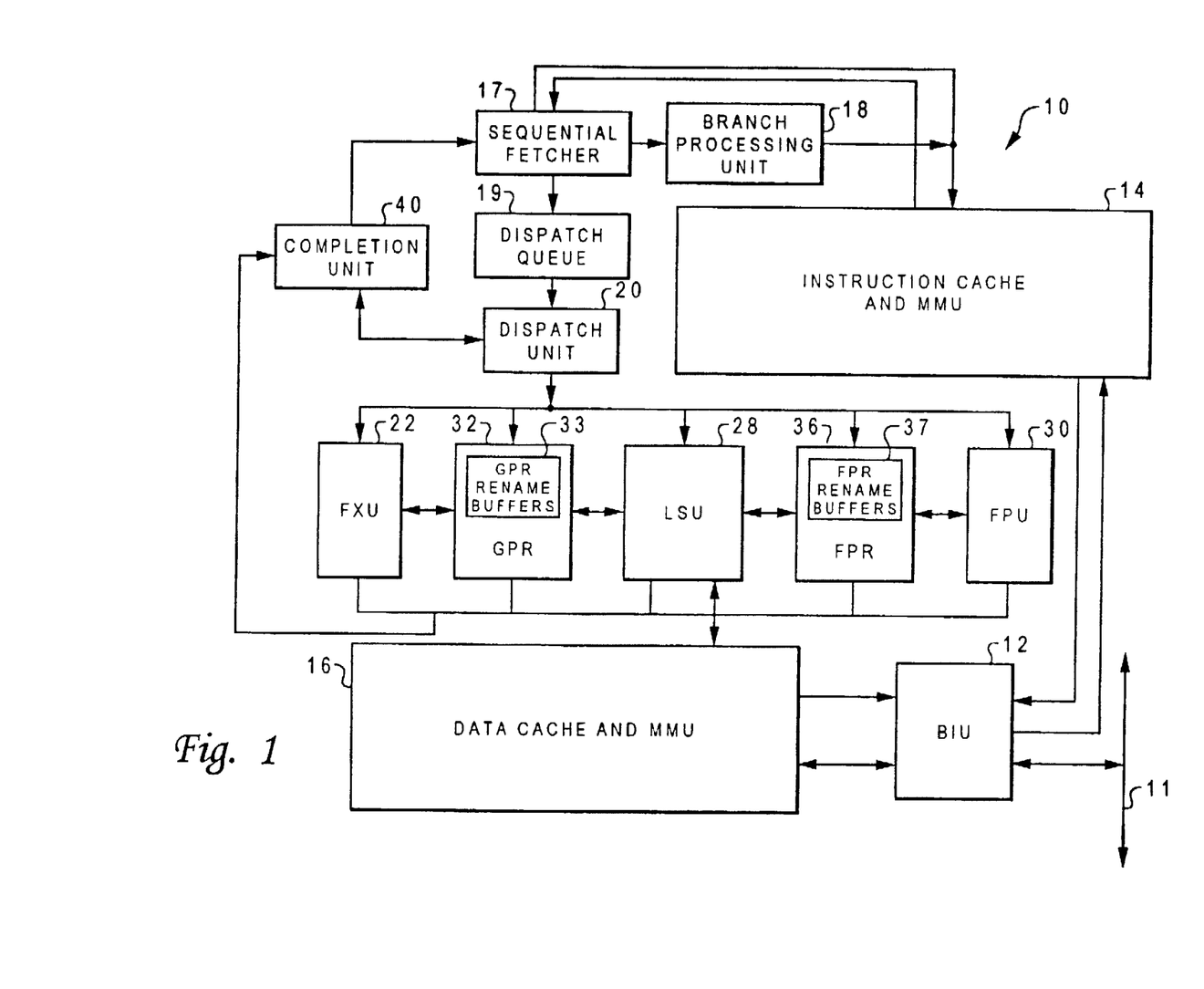
FIG. 1 depicts an illustrative embodiment of a processor having reduced instruction fetch latency.

With reference now to the figures and in particular with reference to FIG. 1, there is depicted a block diagram of an illustrative embodiment of a processor, indicated generally at 10, for processing information in accordance with the invention recited within the appended claims. In the depicted illustrative embodiment, processor 10 comprises a single integrated circuit superscalar microprocessor. Accordingly, as discussed further below, processor 10 includes various execution units, registers, buffers, memories, and other functional units, which are all formed by integrated circuitry. Processor 10 preferably comprises one of the PowerPC™ line of microprocessors available from IBM Microelectronics, which operates according to reduced instruction set computing (RISC) techniques; however, those skilled in the art will appreciate that other suitable processors can be utilized. As illustrated in FIG. 1, processor 10 is coupled to system bus 11 via a bus interface unit (BIU) 12 within processor 10. BIU 12 controls the transfer of information between processor 10 and other devices coupled to system bus 11, such as a main memory (not illustrated). Processor 10, system bus 11, and the other devices coupled to system bus 11 together form a data processing system.

BIU 12 is connected to instruction cache 14 and data cache 16 within processor 10. High-speed caches, such as instruction cache 14 and data cache 16, enable processor 10 to achieve relatively fast access times to a subset of data or instructions previously transferred from main memory to caches 14 and 16, thus improving the performance of the data processing system. Instruction cache 14 is further connected to sequential fetcher 17, which fetches a cache line of instructions from instruction cache 14 during each cycle and transmits the instructions to both branch processing unit (BPU) 18 and dispatch queue 19. Branch instructions are retained by BPU 18 for execution and are cancelled from dispatch queue 19; sequential instructions, on the other hand, are cancelled from BPU 18 and stored within dispatch queue 19 for subsequent execution by other execution circuitry within processor 10.

In the depicted illustrative embodiment, in addition to BPU 18, the execution circuitry of processor 10 comprises multiple execution units for sequential instructions, including fixed-point unit (FXU) 22, load-store unit (LSU) 28, and floating-point unit (FPU) 30. As is well-known to those skilled in the computer arts, each of execution units 22, 28, and 30 typically executes one or more instructions of a particular type of sequential instructions during each processor cycle. For example, FXU 22 performs fixed-point mathematical and logical operations such as addition, subtraction, ANDing, ORing, and XORing, utilizing source operands received from specified general purpose registers (GPRs) 32 or GPR rename buffers 33. Following the execution of a fixed-point instruction, FXU 22 outputs the data results of the instruction to GPR rename buffers 33, which provide temporary storage for the result data until the instruction is completed by transferring the result data from GPR rename buffers 33 to one or more of GPRs 32.

Conversely, FPU 30 typically performs single and double-precision floating-point arithmetic and logical operations, such as floating-point multiplication and division, on source operands received from floating-point registers (FPRs) 36 or FPR rename buffers 37. FPU 30 outputs data resulting from the execution of floating-point instructions to selected FPR rename buffers 37, which temporarily store the result data until the instructions are completed by transferring the result data from FPR rename buffers 37 to selected FPRs 36. As its name implies, LSU 28 typically executes floating-point and fixed-point instructions which either load data from memory (i.e., either data cache 16 or main memory) into selected GPRs 32 or FPRs 36 or which store data from a selected one of GPRs 32, GPR rename buffers 33, FPRs 36, or FPR rename buffers 37 to memory.

Processor 10 employs both pipelining and out-of-order execution of instructions to further improve the performance of its superscalar architecture. Accordingly, instructions can be executed opportunistically by FXU 22, LSU 28, and FPU 30 in any order as long as data dependencies are observed. In addition, instructions are processed by each of FXU 22, LSU 28, and FPU 30 at a sequence of pipeline stages. As is typical of many high-performance processors, each sequential instruction is processed at five distinct pipeline stages, namely, fetch, decode/dispatch, execute, finish, and completion.

During the fetch stage, sequential fetcher 17 retrieves eight instructions stored within a cache line way of instruction cache 14. As noted above, sequential instructions fetched from instruction cache 14 are stored within dispatch queue 19, while branch instructions are removed (folded out) from the sequential instruction stream. As described below, branch instructions are executed by BPU 18, which includes facilities that permit BPU 18 to identify target instructions within a set of instructions fetched from instruction cache 14. Identification of target instructions within a set of fetched instructions obviates the need to again fetch the target instruction (and subsequent sequential instructions) from instruction cache 14, thereby eliminating instruction fetch latency in cases in which a branch instruction and the associated target instruction are within an instruction fetch bandwidth.

During the decode/dispatch stage, dispatch unit 20 decodes and dispatches one or more instructions from dispatch queue 19 to execution units 22, 28, and 30. During the decode/dispatch stage, dispatch unit 20 also allocates a rename buffer within GPR rename buffers 33 or FPR rename buffers 37 for each dispatched instruction's result data. According to a the depicted illustrative embodiment, instructions dispatched by dispatch unit 20 are also passed to a completion buffer within completion unit 40. Processor 10 tracks the program order of the dispatched instructions during out-of-order execution utilizing unique instruction identifiers.

During the execute stage, execution units 22, 28, and 30 execute sequential instructions received from dispatch unit 20 opportunistically as operands and execution resources for the indicated operations become available. Each of execution units 22, 28, and 30 are preferably equipped with a reservation station that stores instructions dispatched to that execution unit until operands or execution resources become available. After execution of an instruction has terminated, execution units 22, 28, and 30 store data results of the instruction within either GPR rename buffers 33 or FPR rename buffers 37, depending upon the instruction type. Then, execution units 22, 28, and 30 notify completion unit 40 which instructions stored within the completion buffer of completion unit 40 have finished execution. Finally, instructions are completed by completion unit 40 in program order by transferring data results of the instructions from GPR rename buffers 33 and FPR rename buffers 37 to GPRs 32 and FPRs 36, respectively.

Figure 2:
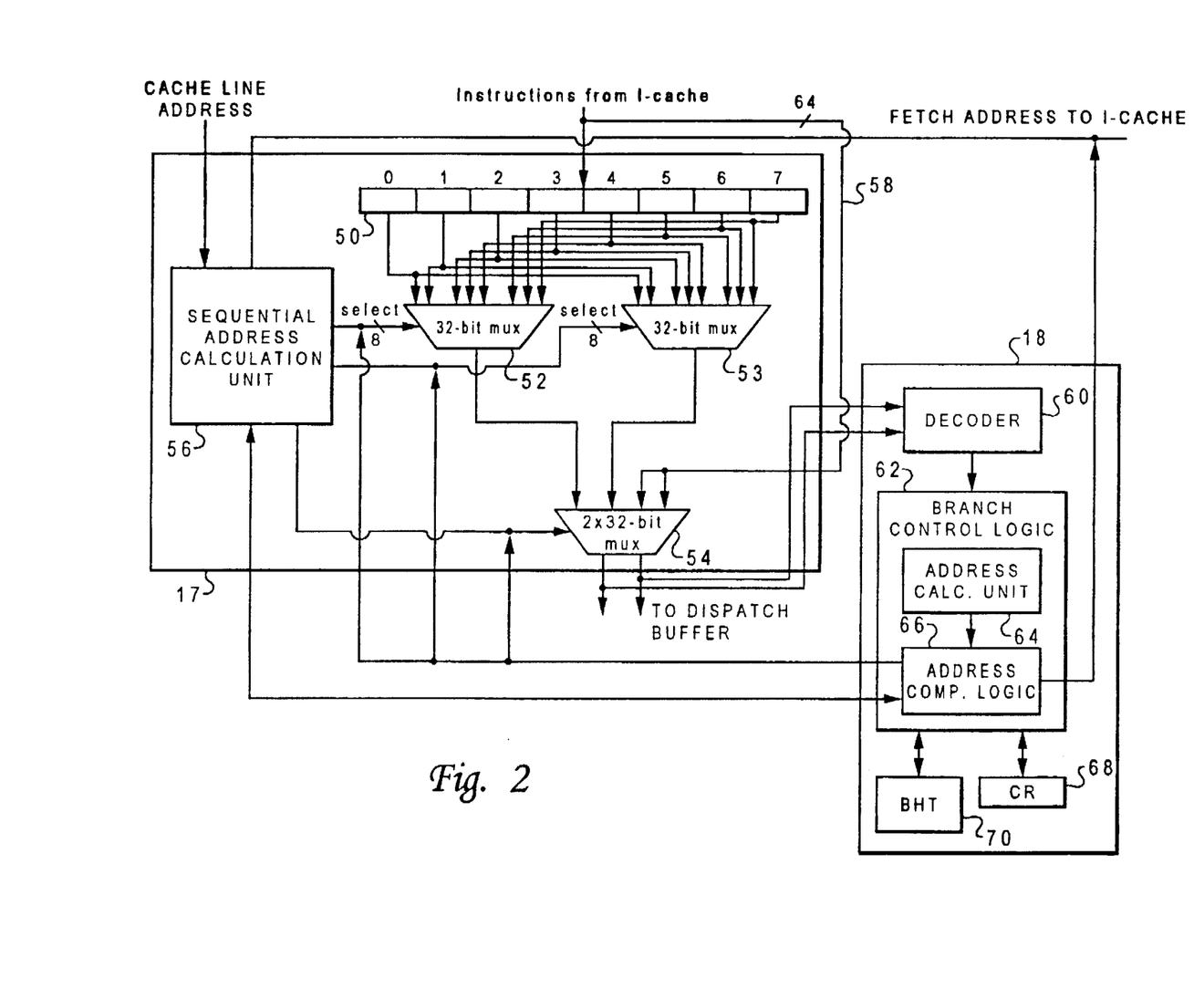
FIG. 2 illustrates a more detailed block diagram representation of the sequential fetcher and branch processing unit of the processor illustrated in FIG. 1.

Referring now to FIG. 2, there is depicted a more detailed block diagram representation of sequential fetcher 17 and BPU 18 within processor 10. As illustrated, sequential fetcher 17 includes instruction buffer 50, multiplexers 52–54, and sequential address calculation unit (SACU) 56. Instructions that are retrieved from a cache line way of instruction cache 14 are stored within instruction buffer 50, which in the depicted embodiment stores eight 32-bit instructions. During each cycle, multiplexers 52–54 are utilized to select two instructions from among the eight instructions stored in instruction buffer 50 and the two instructions presented by bypass path 58 based upon select signals generated by SACU 56 or address comparison logic 66. As indicated, the pair of instructions selected by multiplexers 52–54 is passed to both dispatch queue 19 and BPU 18 for further processing.

Figure 3:
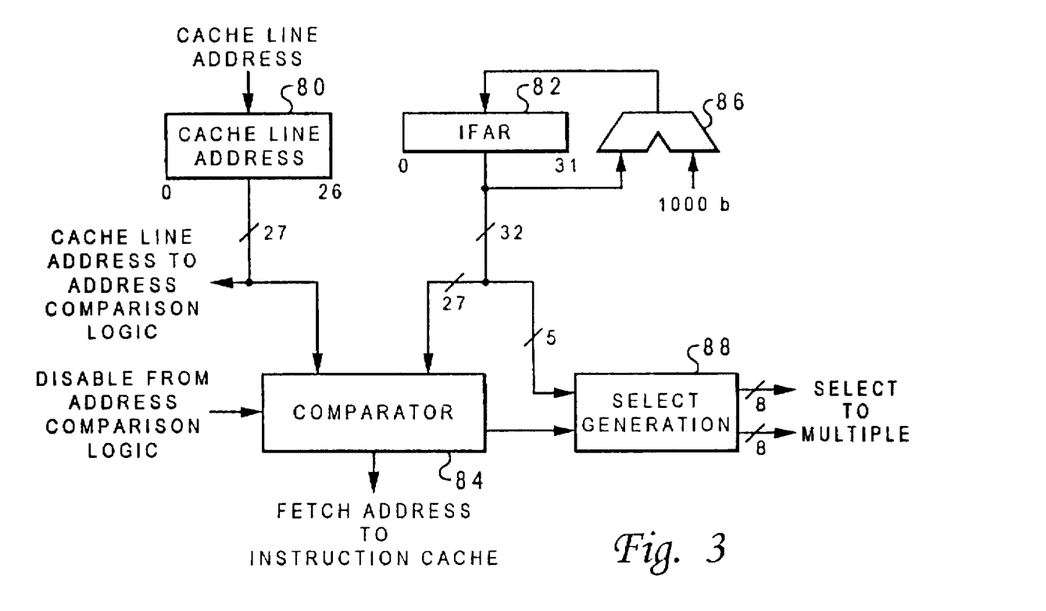
FIG. 3 depicts a more detailed block diagram representation of the sequential address calculation unit (SACU) depicted in FIG. 2.
Figure 4:
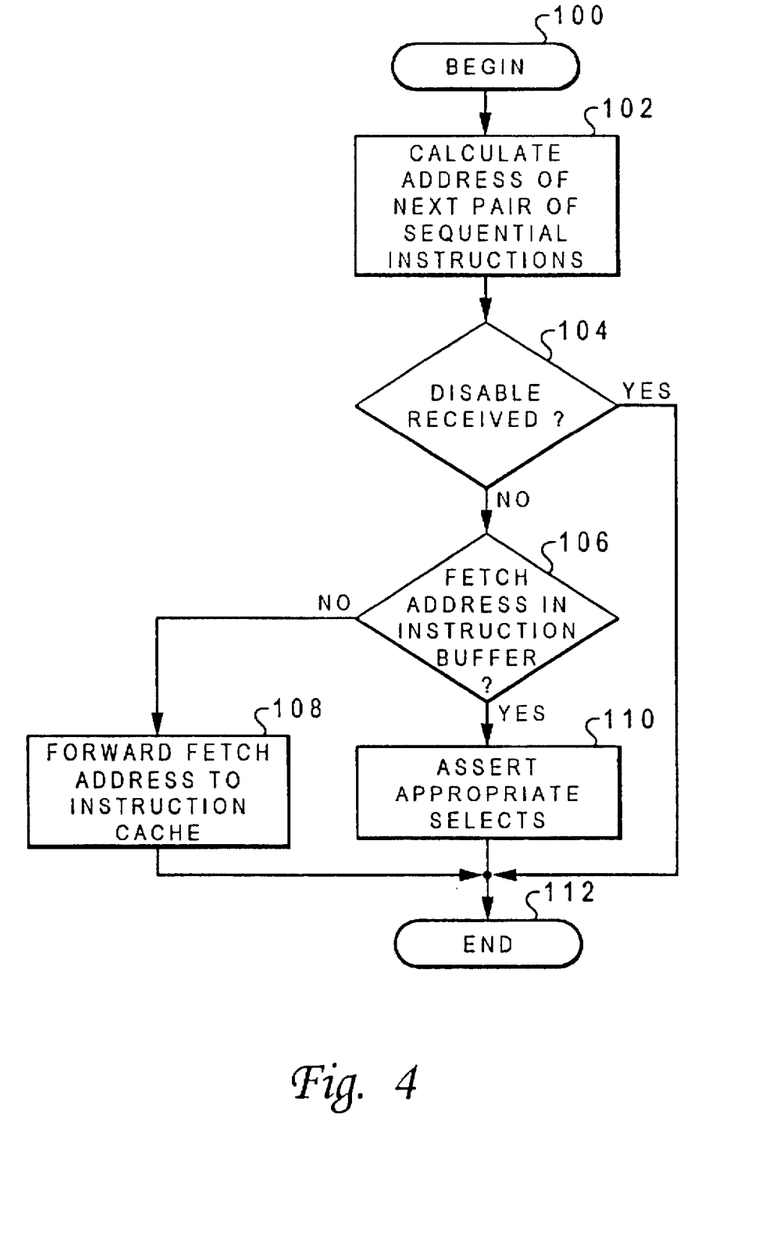
FIG. 4 is a flowchart illustrating the operation of the SACU depicted in FIG. 3.

With reference now to FIGS. 3 and 4, there are illustrated a more detailed block diagram representation of SACU 56 and a flowchart of the method followed by SACU 56 each cycle to calculate the address of a next pair of sequential instructions to be placed within the execution stream of processor 10. Referring first to FIG. 4, when the process begins at block 100 the 27 high-order address bits of the instructions stored within instruction buffer 50 (i.e., the address mapped to the cache line way that stores the instructions) are contained within cache line address register 80. In addition, the 32-bit address of the first instruction within the pair of instructions last selected by multiplexer 54 from among the instructions presented by instruction buffer 50 and bypass path 58 is stored within instruction fetch address register (IFAR) 82. The process proceeds from block 100 to block 102, which illustrates adder 86 calculating the address of the first instruction within the next sequential instruction pair by adding 1000b to the contents of IFAR 82 and storing the sum within IFAR 82. Next, a determination is made at block 104 whether or not a disable signal is received from address comparison logic 66 by comparator 84. If a disable signal is received, indicating that the address of the next instruction to be placed within the execution stream is a nonsequential (target) address, the process terminates at block 112. However, in response to a determination that a disable signal is not received, the process proceeds to block 106, which depicts a determination of whether or not the next sequential instructions to be placed within the execution stream are stored within instruction buffer 50. The determination depicted at block 106 is made by comparing the cache line address stored in cache line address register 80 and the 27 high-order bits of IFAR 82 utilizing comparator 84. In response to a determination that the next pair of sequential instructions to be placed in the execution stream of processor 10 are not stored in instruction buffer 50, comparator 84 passes the 27 high-order bits of the instruction fetch address to instruction cache 14 to initiate the fetching of the 8 instructions in the cache line way to which the instruction fetch address maps. In response to receipt of the instructions specified by the 27-bit instruction fetch address, the 8 instructions are stored within instruction buffer 50. In addition, SACU 56 transmits select signals to multiplexer 54 such that the first two instructions of the eight returned instructions, which are presented as inputs to multiplexer 54 via bypass path 58, are passed to dispatch queue 19 and BPU 18 for further processing.

Returning to block 104, in response to a determination that the next pair of sequential instructions are among the 8 instructions stored in instruction buffer 50, comparator 84 signals select generation logic 88, which as indicated at block 100 of FIG. 4, utilizes the 5 low-order bits of the instruction fetch address to generate the appropriate selects for multiplexers 52–54 to select the next pair of sequential instructions from instruction buffer 50. As illustrated in FIG. 3, eight select signals are preferably generated for each of multiplexers 52 and 53 in order to eliminate further select decoding. Referring again to FIG. 4, the process passes from either block 108 or 110 to block 112, which illustrates the process terminating until the next processor cycle.

Referring again to FIG. 2, BPU 18 includes decoder 60, which decodes each instruction received by BPU 18 from sequential fetcher 17 to determine whether or not the instruction is a branch instruction, and if so, what type of branch instruction. In addition, BPU 18 includes branch control logic 62, which executes each branch instruction identified by decoder 60 through calculating the effective address (EA) of a target instruction utilizing address calculation unit 64. Branch control logic 64 further includes address comparison logic 66, which, as is described below with reference to FIGS. 5 and 6, eliminates instruction fetch latency in cases in which the target instruction of a branch instruction is stored within instruction buffer 50. As depicted, branch control logic 62 is coupled to condition register (CR) 68, which comprises several bits fields that are set or cleared in response to various conditions within the data processing system. Branch control logic 62 references CR 68 to resolve each branch conditional instruction that depends upon the occurrence of an event that sets or clears a bit field within CR 68. Still referring to FIG. 2, branch control logic 62 is further coupled to branch history table (BHT) 70, which is utilized by BPU 18 to predict resolutions of unresolved conditional branch instructions that depend upon the state of a bit field within CR 68.

Figure 5:
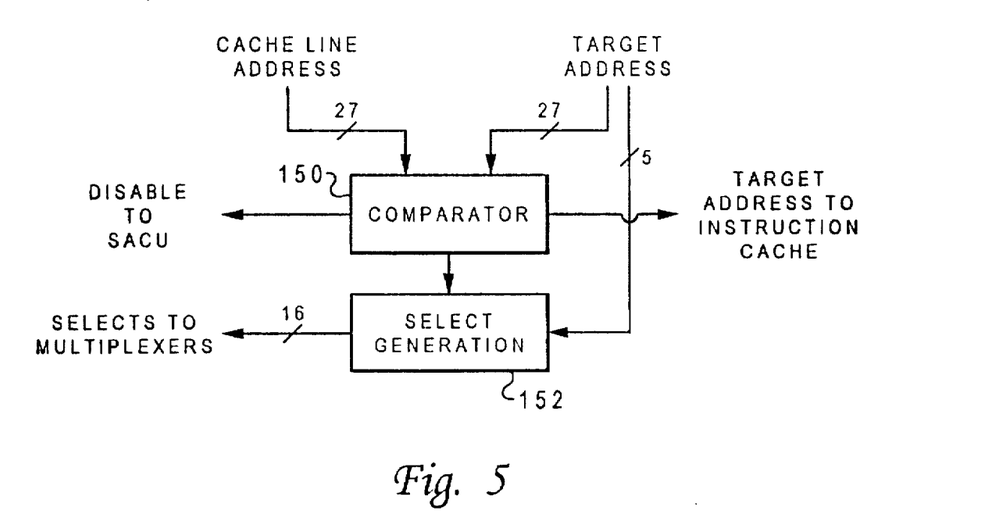
FIG. 5 depicts a more detailed block diagram representation of the address comparison logic illustrated in FIG. 2.
Figure 6:
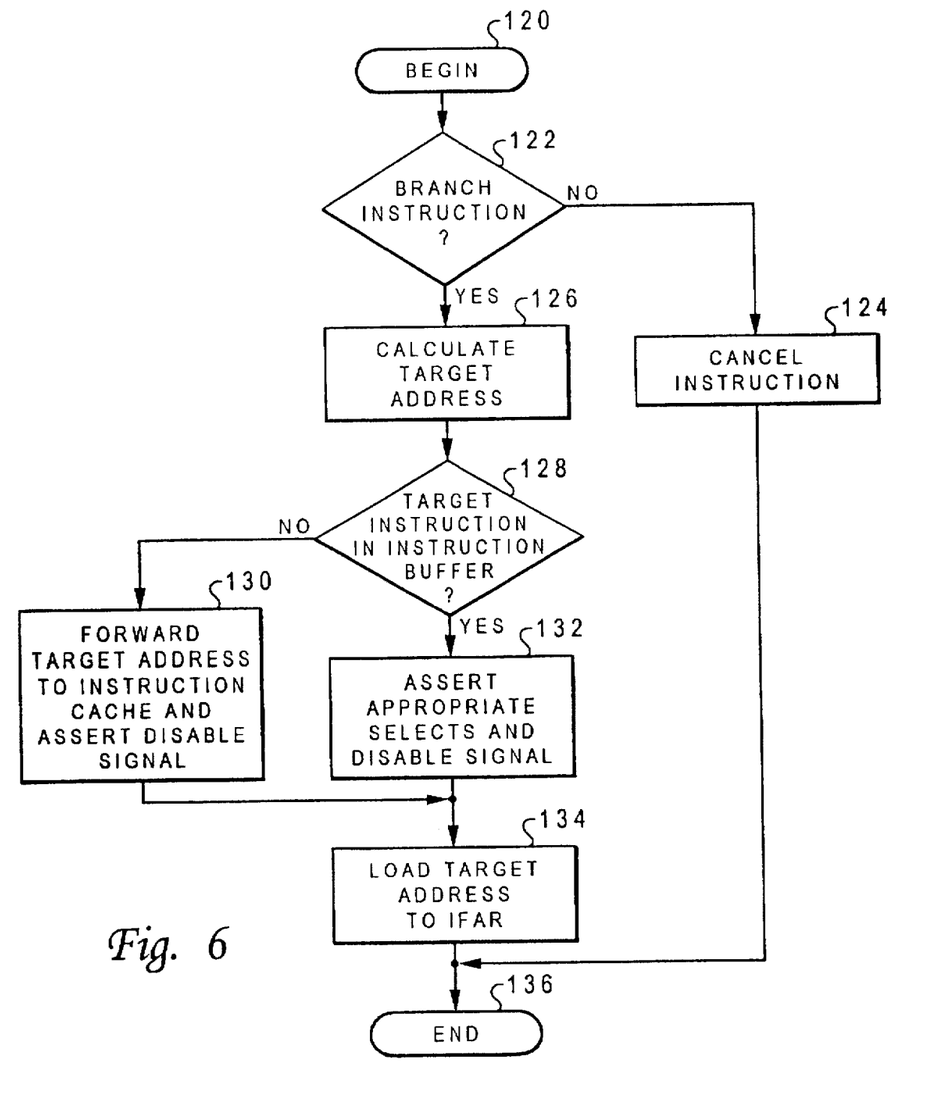
FIG. 6 is a flowchart illustrating the operation of the address comparison logic depicted in FIG. 5.

With reference now to FIGS. 5 and 6, there are illustrated a more detailed block diagram of address comparison logic 66 within BPU 18 and a flowchart of the method of processing instructions employed by BPU 18. Referring first to FIG. 6, the process begins a block 120 in response to receipt by BPU 18 of a pair of instruction selected from instruction buffer 50 or bypass path 58 by multiplexers 52–54. The process proceeds from block 120 to block 122, which illustrates decoder 60 determining whether or not either of the pair of instructions is a branch instruction. As illustrated at block 124, instructions that are not branch instruction are cancelled from BPU 18. The process then proceeds from block 124 to block 136 and terminates.

Referring again to block 122, in response to a determination by decoder 60 that an instruction received from sequential fetcher 17 is a branch instruction, the process proceeds to block 126, which depicts address calculation unit 64 calculating the target address of the branch instruction. For example, if the branch instruction is an unconditional or resolved conditional branch instruction, address calculation unit 64 calculates the address of the target instruction in the manner specified by the branch instruction. If, on the other hand, the branch instruction detected by decoder 60 is an unresolved conditional branch instruction, address calculation unit 64 speculatively executes the branch instruction by predicting whether or not the indicated branch will be taken by reference to BHT 70. In response to the prediction of the branch, address calculation unit 64 is then able to determine the address of the target instruction. The process then proceeds from block 126 to block 128, which illustrates a determination of whether or not the target instruction is stored within the instruction buffer 50. As depicted in FIG. 5, the determination illustrated at block 128 is accomplished by comparator 150 through a comparison of the 27-bit cache line address stored in cache line address register 80 and the 27 high-order bits of the target address determined by address calculation unit 64. Referring again to block 128 of FIG. 6, in response to a determination that the target instruction is not stored within instruction buffer 50, the process proceeds to block 130, which depicts comparator 150 forwarding the 27 high-order bits of the target address to instruction cache 14 to initiate fetching of the 8 instructions stored within the cache line way to which the target address maps. In addition, comparator 150 asserts a disable signal to SACU 56 to inhibit comparator 84 from selecting the source of the next sequential instruction. Thus, if the target instruction is not stored within instruction buffer 50, the instruction fetch of the target instruction proceeds in a conventional manner, thereby incurring at least one cycle of instruction fetch latency.

However, in response to a determination at block 128 that the target instruction is stored within instruction buffer 50 (i.e., the cache line address and the 27 high-order bits of the target address match), the process passes to block 132, which depicts select generation logic 152 asserting the appropriate select signals to multiplexers 52–54 to select the target instruction and the next sequential instruction for placement within the execution stream of processor 10. In addition, comparator 150 asserts a disable signal to SACU 56 as described above to prevent the generation of a conflicting instruction fetch address or select signals. Thus, by selecting the previously fetched target instruction from instruction buffer 50 in lieu of fetching the target instruction from instruction cache 14, execution of the branch instruction and placement of the target instruction into the execution stream of processor 10 are accomplished without incurring any instruction fetch latency.

Thereafter, the process passes from either block 130 or block 132 to block 134, which illustrates loading the target address into IFAR 82 to update the instruction pointer to the new execution path. As will be understood by those skilled in the art, in cases in which a branch instruction is speculatively executed, the previous value of IFAR 82 is also temporarily saved within a register until the branch resolves in order to facilitate the recovery operations performed in response to a misprediction. Thereafter, the process passes to block 136 and terminates.

A processor and method of executing instructions have been described, wherein a single instruction fetch is sufficient to result in execution of a branch instruction and an associated target instruction. The disclosed processor and method enhance processor performance by eliminating instruction fetch latency in cases in which the branch instruction and target instruction are both within an instruction fetch bandwidth. The elimination of instruction fetch latency in such cases results in a performance enhancement of at least one cycle for each iteration of an instruction loop that is executed. Although a particular illustrative embodiment has been described that utilizes 32-bit instructions and an instruction cache that stores 8 instructions per cache line way, those skilled in the art will appreciate that these are design choices and that other instruction lengths and instruction cache sizes may alternatively be implemented.

While an illustrative embodiment has been particularly shown and described, it will be understood by those skilled in the art that various changes in form and detail may be made therein without departing from the spirit and scope of the illustrative embodiment.

What is claimed is:

1. A method of executing instructions within a processor, said processor having a memory associated therewith, said method comprising:

simultaneously fetching a plurality of instructions from said memory;

detecting a branch instruction among said plurality of instructions;

in response to a detection of said branch instruction, executing said branch instruction to determine a target instruction to be executed;

in response to said determination of said target instruction, determining if said target instruction is one of said plurality of instructions simultaneously fetched from said memory; and in response to a determination that said target instruction is one of said plurality of instructions, executing said target instruction, wherein said branch instruction and said target instruction are both executed in response to a single instruction fetch.

2. The method of claim 1, said processor including an instruction buffer, said method further comprising temporarily storing said plurality of instructions within said instruction buffer.

3. The method of claim 2, and further comprising the step of maintaining said plurality of instructions within said instruction buffer at least until a branch indicated by said branch instruction is not taken.

4. The method of claim 2, wherein said processor includes a dispatch buffer for storing instructions to be dispatched, wherein said step of executing said target instruction comprises the step of storing a copy of said target instruction stored in said instruction buffer within said dispatch buffer.

5. The method of claim 1, wherein said step of executing said branch instruction to determine a target instruction to be executed comprises the step of determining a target address.

6. The method of claim 5, wherein said step of determining if said target instruction is one of said plurality of instructions simultaneously fetched from said memory comprises determining whether or not said target address matches an address of one of said plurality of instructions.

7. A processor, said processor having a memory associated therewith, said processor comprising:

an instruction buffer, wherein said instruction buffer stores a plurality of instructions simultaneously fetched from said memory;

a branch processing unit, wherein responsive to a detection of a branch instruction among said plurality of instructions, said branch processing unit determines a target instruction to be executed;

logic means for determining if said target instruction is stored within said instruction buffer; and means, responsive to said determination that said target instruction is stored within said instruction buffer, for executing said target instruction, wherein said branch instruction and said target instruction are both executed in response to a single instruction fetch.

8. The processor of claim 7, and further comprising an instruction fetcher, wherein said instruction fetcher simultaneously fetches said plurality of instructions from said memory.

9. The processor of claim 7, and further comprising an instruction decoder, wherein said instruction decoder detects branch instructions among said plurality of instructions.

10. The processor of claim 7, wherein said means for executing said target instruction includes a dispatch buffer for storing instructions to be dispatched and an execution unit.

11. The processor of claim 7, wherein said branch processing unit includes an address calculation unit for determining a target address of said target instruction.

12. The processor of claim 11, and further comprising comparison logic for determining whether or not said target address matches an address of one of said plurality of instructions stored within said instruction buffer.

13. A data processing system, comprising:
   a memory, wherein said memory stores multiple instructions;
   a bus coupled to said memory;
   a processor coupled to said bus, said processor including:
      an instruction buffer, wherein said instruction buffer stores a plurality of instructions simultaneously fetched from said memory;
      a branch processing unit, wherein responsive to a detection of a branch instruction among said plurality of instructions, said branch processing unit determines a target instruction to be executed;
      logic means for determining if said target instruction is stored within said instruction buffer; and
      means, responsive to said determination that said target instruction is stored within said instruction buffer, for executing said target instruction, wherein said branch instruction and said target instruction are both executed in response to a single instruction fetch.

14. The data processing system of claim 13, and further comprising an instruction fetcher, wherein said instruction fetcher simultaneously fetches said plurality of instructions from said memory.

15. The data processing system of claim 13, and further comprising an instruction decoder, wherein said instruction decoder detects branch instructions among said plurality of instructions.

16. The data processing system of claim 13, wherein said means for executing said target instruction includes a dispatch buffer for storing instructions to be dispatched and an execution unit.

17. The data processing system of claim 13, wherein said branch processing unit includes an address calculation unit for determining a target address of said target instruction.

18. The data processing system of claim 17, and further comprising comparison logic for determining whether or not said target address matches an address of one of said plurality of instructions stored within said instruction buffer.

* * * * *